Nov. 12, 1957  G. F. GARDNER  2,812,731
TRACTOR BORNE CABLE LAYER
Filed Oct. 28, 1953  3 Sheets-Sheet 1

INVENTOR.
GUY F. GARDNER
BY
Carlson, Pitzner, Hubbard & Wolfe
ATTORNEYS.

Nov. 12, 1957  G. F. GARDNER  2,812,731
TRACTOR BORNE CABLE LAYER
Filed Oct. 28, 1953  3 Sheets-Sheet 3

INVENTOR.
GUY F. GARDNER
BY
*Carlson, Pitzner, Hubbard & Wolfe*
ATTORNEYS.

United States Patent Office 2,812,731
Patented Nov. 12, 1957

2,812,731

TRACTOR BORNE CABLE LAYER

Guy F. Gardner, Dearborn, Mich., assignor, by mesne assignments, to Massey-Harris-Ferguson Inc., Racine, Wis., a corporation of Maryland Application October 28, 1953, Serial No. 388,855

2 Claims. (Cl. 111—5)

The present invention relates to underground cable layers of the type adapted simultaneously to cut a self-closing trough in the ground and to pay cable, tubing, or the like into such trough. More particularly, the invention pertains to a cable laying attachment which may be easily added to subsoiler implement adapted to be drawn by a tractor to provide a complete cable laying installation.

It is a general object of the present invention to provide a cable layer of the foregoing type which is formed by the removable addition of a simple attachment to a tractor-carried subsoiler implement. Upon the aquisition of a subsoiler implement, a farmer or other tractor owner may have a complete cable laying outfit with very little additional investment for the attachment of the present invention. Such an outfit is of particular utility in view of the availability of self-protected electric cables, plastic water tubes, etc., which may be laid underground from a point of supply to a remote point of use.

It is another object to provide such a cable layer in laying which the attachment may be easily installed on or removed from a subsoiler type implement by a quick field operation thereby permitting the subsoiler to be used alone for its various soil-working functions.

Another object is the provision of such a cable layer which is of rugged, economical construction and effective in laying cables or tubes of different sizes with little frictional drag.

Other objects and advantages will become apparent as the following description proceeds, taken in conjunction with the accompanying drawings, in which.

Although a particular embodiment of the invention has been shown and is described in some detail, there is no intention to thereby limit the invention to such details. On the contrary, it is intended here to cover all alterations, modifications, and equivalents falling within the spirit and scope of the invention as defined in the appended claims.

Figure 1:
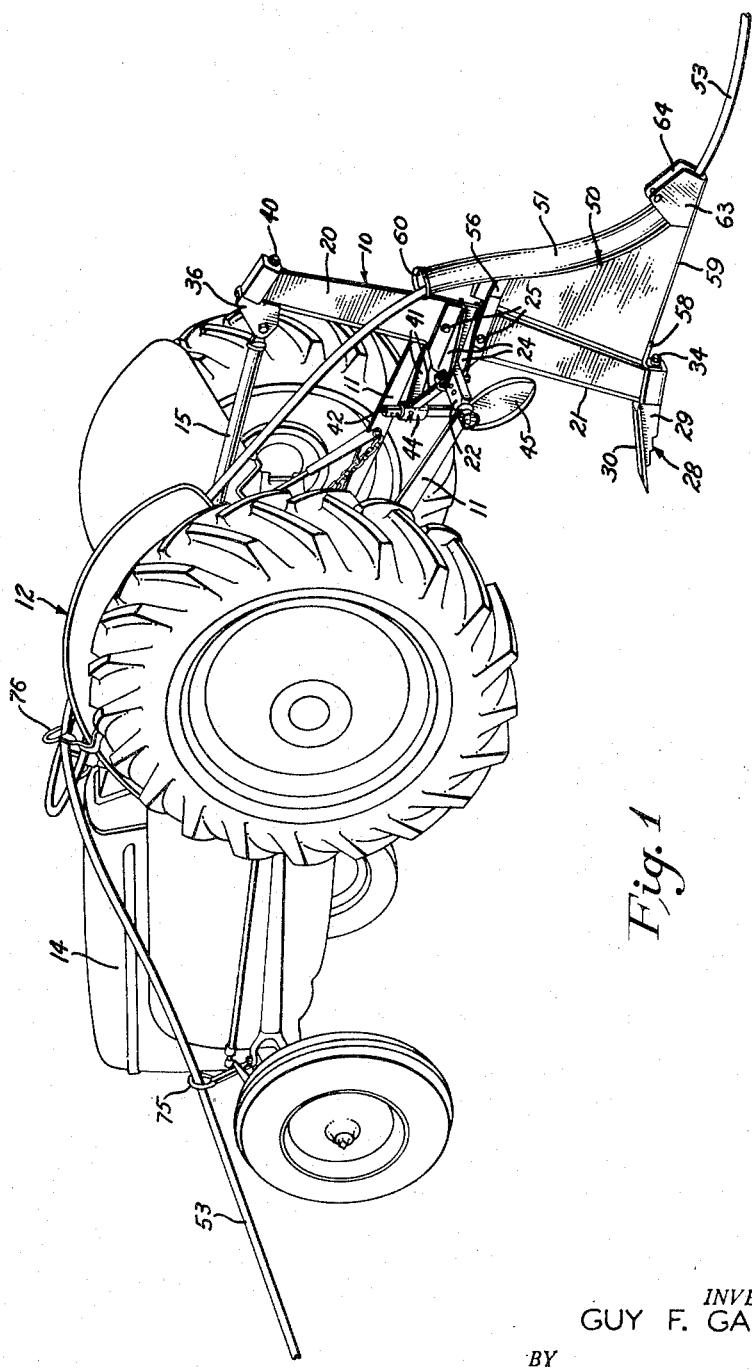
Figure 1 is a perspective view of an embodiment of the present cable layer, shown as mounted on a tractor having a power elevatable three point implement hitch.
Figure 2:
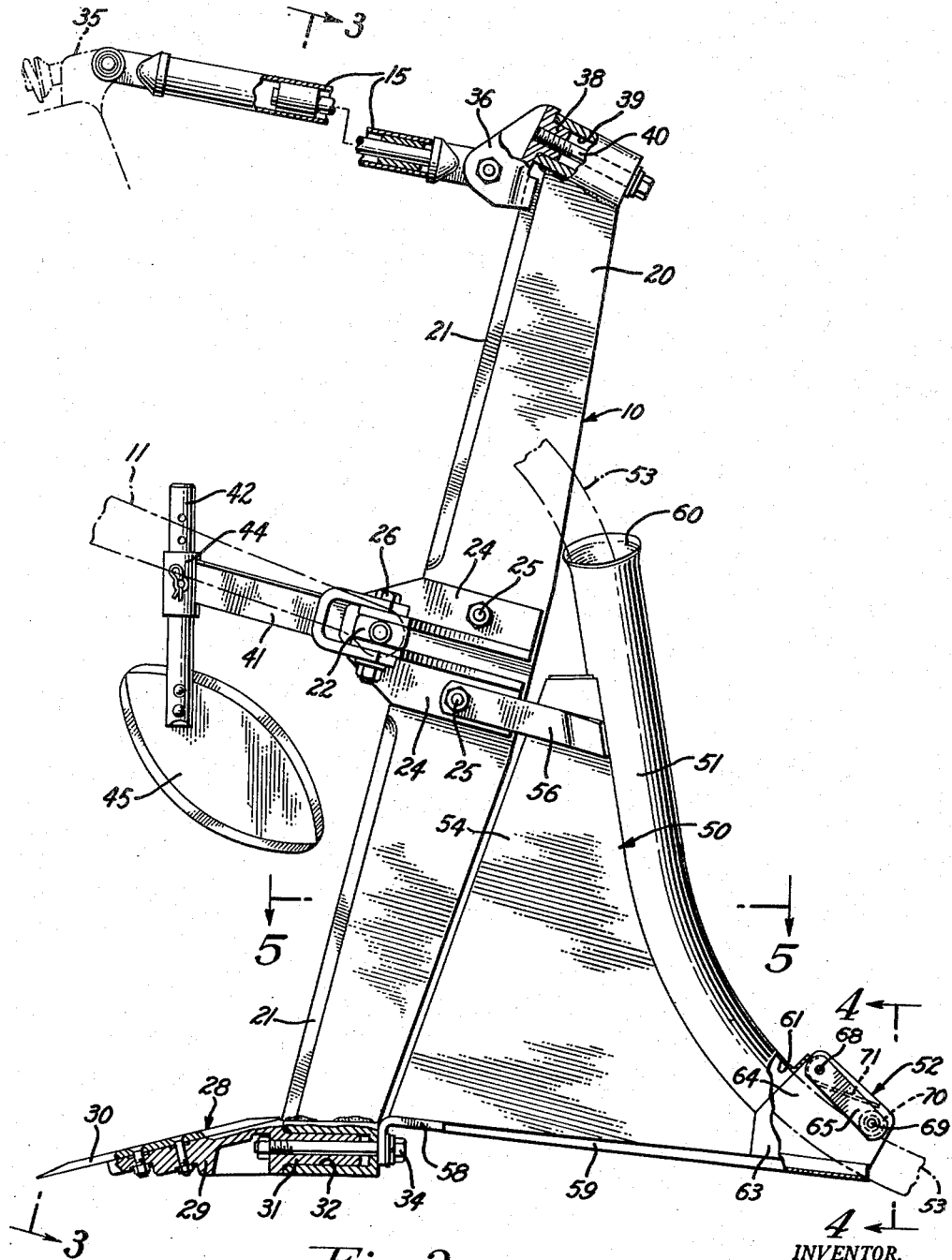
Figure 2 is an enlarged side elevation of the cable layer.
Figure 3:
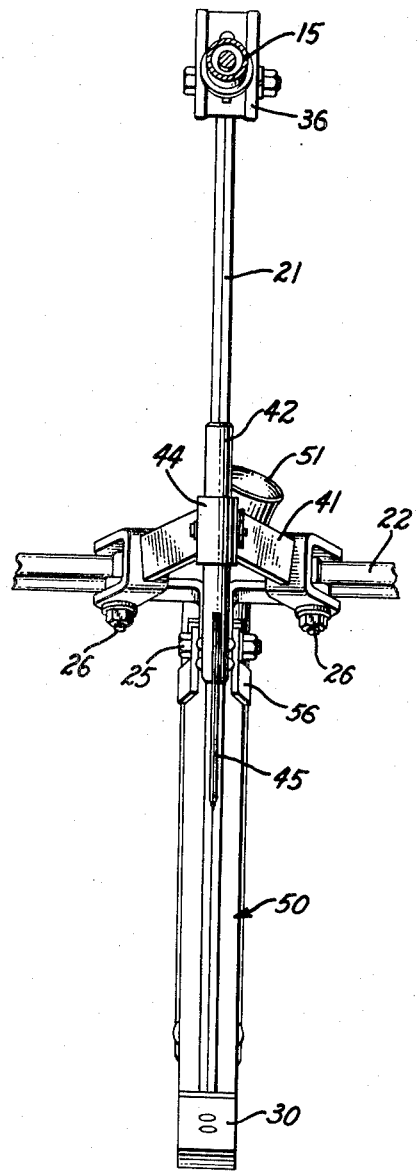
Figure 3 is a front elevation of the cable layer, partially in section taken substantially along the line 3—3 in Figure 2.

Referring more particularly to the exemplary embodiment of the invention here shown, the novel cable laying attachment is illustrated (Figure 1) as removably connected in trailing relation to a subsoiler 10 to form a cable layer carried by rear hitch links 11 of a tractor 12. The tractor 12 and the subsoiler 10 may take various forms, and are here shown to make clear the preferred form of the present invention.

The tractor 12 itself will be recognized by those skilled in the art as the familiar "Ferguson" tractor. It includes a forward engine section 14 and is equipped in this instance with power mechanism for elevating the trailing draft links 11. Preferably, the draft links 11 are controlled by a rear hitch mechanism of the type fully disclosed in Ferguson Patent 2,118,180. The draft links 11 are universally pivoted at their forward ends to the rear of the tractor and elevatable to a desired position by a hydraulic ram mechanism (not shown) controlled by valve means associated with a quadrant lever (not shown). Once positioned by setting the quadrant lever, the elevation of the draft links is additionally automatically controllable in response to the forward thrust of a top link 15, a selected depth of operation for an implement being automatically maintained under uniform soil texture conditions.

The subsoiler 10 may be of the type disclosed and claimed in applicant's copending application Serial No. 388,854, filed of even date, now Patent No. 2,786,404, issued March 26, 1957. It includes an upright blade or beam 20 having a sharpened leading edge 21 for knifing through the ground, the upper and lower portions of the leading edge being reversible to the lower working position so that resharpening is not necessary until both portions have become dulled in use. The blade 20 is mounted in cruciform relation on a drawbar 22, the latter being pivoted between the ends of the draft links 11, by means of upper and lower pairs of fastening brackets 24 spaced vertically on the beam, and extending forwardly to embrace the drawbar 22 for connection by suitable bolts 26. The beam is secured at its midportion to the brackets 24 (and thus to the drawbar 22) by suitable fastening means such as bolts 25 located on either side of the longitudinal center of the beam.

The beam 20 has at either end a socket construction for receiving either a share plate assembly 28 or the trailing end of the top control link 15, here shown as an extensible or telescoping link. The lower end of the beam is equipped with the share plate assembly 28 which includes a tip base 29 carrying a double-edged sharpened share plate 30 and having a projection 31 inserted into a socket 32 and secured by means such as a bolt 34 passed through mating holes. The upper control link 15 is formed to have limited telescopic action and is pivoted between the upper end of the beam and a control rocker 35 aft on the tractor 12. For this purpose it includes a yoke 36 having a projection 38 which is inserted into a socket 39, identical to the socket 32, on the upper end of the beam and secured by a bolt 40 threaded into such projection.

Because the sockets 32 and 39 provided at the upper and lower ends of the beam 20 are identical, the tip base 29 and yoke 36 may be removed and the beam reversed end-for-end by turning the drawbar 22 end-for-end between the draft links 11. The tip base 29 and yoke 36 may then be replaced as shown. The elevation of the beam and the depth to which the share plate 30 cuts through the ground as the tractor 12 advances may be adjusted by varying the elevation of the draft links 11. When in working position, the top link 15 collapses to resist ground resistance or draft forces on the lower end of the beam 20 tending to pivot the drawbar 22 about its longitudinal axis and apply such forces to the automatic draft control rocker 35 on the tractor. On the other hand, when the beam is raised to a stowed or transport position the top link 15 is extended to "tuck up" the lower end of the beam 20 and provide increased ground clearance. This action is more particularly described in the above-mentioned copending application.

In order to break the sod and cut through foreign matter in the path of the beam, a leading coulter may be provided, carried on a forwardly extending V-shaped bracket 41 attached to the drawbar 22 and having a stem 42 vertically positionable in a collar 44. A reversible coulter blade 45 is attached to the lower end of the stem 42 by suitable bolts or rivets. When the beam 20 is turned end-for-end to reverse its cutting edge portions, the bracket 41 is removed from the drawbar 22 by removal of fastening bolts 26, turned over, and replaced in the position shown with the blade 45 depending in front of the beam's lower edge portion. By this expedient, the coulter is adapted to work in front of the beam 20 in either position of the latter. And when the leading edge of the blade 45 becomes dulled, it may be reversed on the stem 42.

Pursuant to the present invention, a cable laying attachment is provided for removable connection in trailing relation to the lower end of the beam 20, being drawn through the self-closing ground trough cut by the latter. The attachment comprises a V-shaped shield 50 having mounting brackets and carrying a guide tube 51 at its wider rear edge. Friction-reducing means in the form of a roller assembly 52 adjustable to accommodate cables of different diameters are provided at the lower end of the tube 51 to facilitate the paying of cable 53 into the ground trough.

Figure 5:
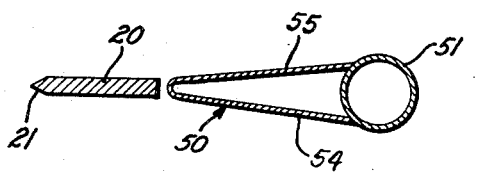
Figure 5 is a horizontal section taken substantially along the line 5—5 in Figure 2.

The shield 50 as here shown is formed of two plates 54—55 welded or otherwise secured along their leading edges and spread in a rearward direction to have a wedge or V-shaped cross section (Fig. 5). The rear edges of the plates 54—55 are spaced sufficiently to receive the guide tube 51 and are inclined downwardly in a rearward direction. The shield 50 is removably mounted on the subsoiler beam 20 by a pair of upper forwardly extending arms 56, welded or otherwise secured to either plate 54—55 and extending to embrace the beam brackets 24. The same bolts 25 which clamp the brackets 24 to the beam 20 may also be used to clamp these arms. At the lower edge of the shield, an angled bracket 58 is provided which is apertured for connection by the same bolt 34 which holds the tip base 29 in the beam's lower socket 32. A bottom plate 59 is welded along the lower edge of the shield 50 to prevent entry of dirt or other foreign matter up into the space between the plates 54—55.

With this arrangement, the cable laying attachment is connectable in the same manner and with equal facility to the lowermost end of the subsoiler as the drawbar 22 and cutter beam 20 are reversed end for end to utilize alternately the two knife edge portions 21. The arms 56 need only be connected to the bolt 25 that is lowermost, and the angles bracket 58 will then be properly located for connection with the bolt 34 extending into the lower one of the two identical sockets 32, 39.

The guide tube 51 is carried, as by welding, on the spaced trailing edges of the shield plates 54—55 and is disposed generally in a downwardly and rearwardly inclined position. The tube is preferably curved as shown so that its lower end approaches a horizontal orientation. The entrance 60 to the tube is disposed above the beam brackets 24, i. e., above the ground when the beam is cutting a trough even of maximum depth and is preferably flared for the easy passage of the cable 53 through it. The exit 61 from the tube is disposed at the approximate level of the beam's lower end, facing rearwardly to pay the cable 53 into the ground trough, preferably the enlarged portion of the trough cut by the share plate 30.

Figure 4:
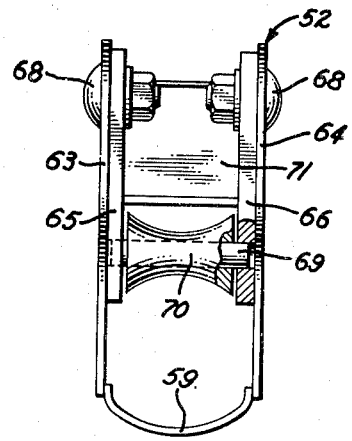
Figure 4 is a fragmentary rear elevation of the attachment, taken along the line 4—4 in Figure 2.

The friction-reducing roller assembly 52 at the exit from the tube comprises a pair of spaced upstanding ears 63—64 suitably fastened, as by welding, to the bottom plate 59 on either side of the tube 51. The ears 63—64 carry at their upper corners respective ones of a pair of roller-carrying arms 65—66, each arm being secured by a bolt 68 and adjustable in position upon the loosening of such bolt (Fig. 4). The arms 65—66 extend in a rearward direction and are apertured at their other ends to receive a roller pin 69 carrying an axially concave rotatable roller 70. The roller 70 and pin 69 are held captive by engagement of the latter at its ends with the ears 63—64. The position of the roller 70 with respect to the bottom plate 59 may be adjusted to accommodate a wide range of different size cables simply by loosening the bolts 68 and swinging the arms 65—66 about their forward ends. In addition, for cleaning the roller 70 of any dirt or foreign matter which might accumulate to impair its smooth operation, it is only necessary to loosen the bolts 68 and swing the arms 65—66 above the ears 63—64, after which the roller pin 69 and roller 70 may be removed and replaced. A dirt guard in the form of a plate 71 is preferably provided as shown, welded between the two roller arms 65—66, extending from the bolts 68 to the roller 70 and closing the upper entrance to the space between the ears 63—64.

In addition to the main attachment adapted for connection to the subsoiler beam 20, a pair of guide rings 75—76 (Fig. 1) may be provided and adapted for removable mounting at spaced points along the forward portion of the tractor. A first such ring 75 may be mounted on the tractor's forward axle and a second such ring 76 clamped to the mud guard above the tractor's rear wheel. These rings serve to guide the cable 53 as it is payed into the entrance 60 of the guide tube 51 and out into a ground trough.

*Installation and operation*

It is but a simple field operation to mount the present cable laying attachment on the subsoiler 10 to create a complete cable layer. The bolt 25 through the lower pair of beam brackets 24 and the share plate assembly bolt 34 are merely removed, the upper arms 56 are placed to embrace the lower brackets 24, and the two bolts 25 and 34 replaced to clamp the upper arms 56 and the lower bracket 58 to the beam 20. If desired, the cable laying attachment may be left semi-permanently connected to the beam 20, and removed from or placed on the tractor 12 as an integral part of the subsoiler 10.

To lay a length of cable 53, it is simply threaded through the guide rings 75—76 and down through the guide tube 51. Preferably, the cable 53 is first stretched out on the ground along the course in which it is to be laid. Alternatively, a spool of cable may be carried forward on the tractor or by a truck or other vehicle driven in front of the tractor. The cable 53 is initially anchored at the starting point so that as the tractor 12 is driven forward with the lower end of the beam 20 cutting a ground trough, the cable 53 is payed out through the guide tube 51 to lie in the bottom of the trough. Because the beam 10 cuts a relatively narrow slot leading to the enlarged portion of the trough cut by the share plate 30, there is little or no necessity for performing a refilling operation to completely bury the cable under ground. The cable is fed into the enlarged portion of the trough and the slot closes itself. The guide tube 51 is freely drawn through this slot before it closes, however, by virtue of the wedge or V-shaped shield 50 spreading the ground in front.

As the cable is drawn from the exit 61 of the tube 51, it is further guided with little friction by engagement with the bottom side of the roller 70. Dirt is kept out of the tube exit by the guard plate 71. However, should dirt accumulate to interfere with the action of the roller 70, it may be easily removed by loosening the clamping bolts 68, swinging the roller arms 65—66 upwardly, whereupon the roller 70 may be removed and replaced. The position of the roller 70 may be set by adjusting these arms 65—66 to provide for proper engagement with cables of a wide range of diameters. The entire operation, then, of mounting or removing the present cable laying attachment for use with a subsoiler is quickly and easily accomplished to provide an effective yet economical cable laying installation.

I claim as my invention:

1. For use with a tractor having a pair of trailing draft links, a cable layer comprising, in combination, a subsoiler including a drawbar pivotally connected horizontally between the ends of the draft links, a cutter beam having knife edge portions on either side of its longitudinal center, fastening means engaging said beam on either side of its vertical center for fixing the beam in upright cruciform relation to said drawbar thereby affording reversal of said edge portions to the lower cutting position upon reversal of said drawbar end-for-end between the draft links, identical sockets at either end of said beam, a top link connected between the upper socket and the tractor, and a share plate and means for securing it to the lower socket by a rearwardly projecting bolt; and an attachment including a pair of plates fixed together at their leading edges and diverging rearwardly to form a shield V-shaped in horizontal cross section, arms rigidly fixed to and extending forwardly from the upper end of the narrower leading edge of said shield and removably and rigidly connected to said beam by said fastening means, a downturned apertured bracket rigidly fixed to the lower forward edge of said shield and removably and rigidly connected to said beam by said rearwardly projecting bolt, a guide tube fixed at the wider, trailing edge of said shield and inclined rearwardly and downwardly, said tube having its entrance located above the center of said beam and its exit at substantially the level of said share plate assembly, the attachment thus being connectable to the lower end of said beam even though the latter is reversed by utilizing the same means which connect the beam to the drawbar and the share plate to the beam.

2. In combination with a tractor-drawn subsoiler implement having a vertically disposed cutter beam supported to have its lower portion cut a trough through the ground, a cable layer attachment including a pair of plates fixed together at their leading edges and diverging rearwardly to form a shield V-shaped in horizontal cross section, means for rigidly attaching the leading edge of said shield in trailing relation to the lower portion of said cutter beam, a bottom plate fixed to and extending between the lower edges of said pair of plates and projecting rearwardly beyond the rearmost edges of the latter, a guide tube rigidly fastened to the training edges of said pair of plates and inclined rearwardly and downwardly, said guide tube terminating in an exit located above and forwardly of the rear edge of said bottom plate, a pair of upstanding ears rigidly fixed to the rear portion of said bottom plate and straddling said tube exit, a pair of arms adjustably pivoted at their forward ends to said ears above the said tube exit, an axially concave roller captively carried between the rear ends of said arms for engaging the upper side of a cable payed through said tube, and means for locking said arms in adjusted pivotal positions relative to said ears, so that said roller may be locked in different adjusted positions above said bottom plate to accommodate cables of different diameters.

References Cited in the file of this patent

UNITED STATES PATENTS

| 628,039 | Rood et al. | July 4, 1899 |
| 1,886,510 | Murphy | Nov. 8, 1932 |
| 2,118,553 | Garlinger | May 24, 1938 |
| 2,135,973 | Garlinger | Nov. 8, 1938 |
| 2,663,515 | Kinsinger | Dec. 22, 1953 |
| 2,673,510 | Bailey | Mar. 30, 1954 |
| 2,722,181 | Hash | Nov. 1, 1955 |

FOREIGN PATENTS

| 557,213 | Great Britain | Nov. 10, 1943 |
| 661,914 | Great Britain | Nov. 28, 1951 |